United States Patent
Li (10) Patent No.: US 12,156,207 B2
(45) Date of Patent: Nov. 26, 2024

(54) METHOD AND APPARATUS FOR RESOURCE ALLOCATION, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 361 days.

(21) Appl. No.: 17/627,470

(22) PCT Filed: Jul. 16, 2019

(86) PCT No.: PCT/CN2019/096235
§ 371 (c)(1),
(2) Date: Jan. 14, 2022

(87) PCT Pub. No.: WO2021/007787
PCT Pub. Date: Jan. 21, 2021

(65) Prior Publication Data
US 2022/0279554 A1    Sep. 1, 2022

(51) Int. Cl.
*H04W 72/12*      (2023.01)
*H04L 5/00*       (2006.01)
*H04W 72/04*      (2023.01)
*H04W 72/044*     (2023.01)
*H04W 72/1273*    (2023.01)
(Continued)

(52) U.S. Cl.
CPC ....... *H04W 72/1273* (2013.01); *H04L 5/0098* (2013.01); *H04W 72/044* (2013.01); *H04W 74/0816* (2013.01)

(58) Field of Classification Search
CPC ..... H04L 5/001; H04L 5/0035; H04L 5/0091; H04L 5/0098; H04W 72/044; H04W 72/0453; H04W 72/1273; H04W 74/0816
See application file for complete search history.

(56) References Cited

U.S. PATENT DOCUMENTS

2019/0020386 A1*  1/2019  Park .................... H04B 7/04
2020/0169995 A1*  5/2020  Nam .................... H04W 72/21
(Continued)

FOREIGN PATENT DOCUMENTS

| CN | 109314972 A | 2/2019 |
|---|---|---|
| JP | 2019087799 A | 6/2019 |
| WO | WO 2019096206 A1 | 5/2019 |

OTHER PUBLICATIONS

European Patent Application No. 19937840.7, Search and Opinion dated Feb. 6, 2023, 10 pages.
(Continued)

*Primary Examiner* — Awet Haile
(74) *Attorney, Agent, or Firm* — Cozen O'Connor (57) ABSTRACT

A method for resource allocation is performed by a network device and includes: determining a second bandwidth part (BWP) based on channel idle bandwidth units (BWUs), detected by each of at least two antenna panels in a first BWP; and transmitting an indication signaling, the indication signaling being configured for indicating the second BWP is taken as an active BWP, and/or for indicating channel idle states of the BWUs in the second BWP. The channel idle state is configured to characterize whether a channel of each BWU is idle.

20 Claims, 6 Drawing Sheets

(51) Int. Cl.
*H04W 74/08* (2024.01)
*H04W 74/0816* (2024.01)

(56) References Cited

U.S. PATENT DOCUMENTS

| | | | |
|---|---|---|---|
| 2020/0267712 A1* | 8/2020 | Cirik | H04W 72/23 |
| 2021/0281301 A1* | 9/2021 | Takano | H04B 7/0695 |
| 2022/0201748 A1* | 6/2022 | Harada | H04L 5/0053 |
| 2023/0345440 A1* | 10/2023 | Cui | H04W 72/21 |

OTHER PUBLICATIONS

Japanese Patent Application No. 2022-502620, Office Action dated Apr. 4, 2023, 5 pages.
Japanese Patent Application No. 2022-502620, English translation of Office Action dated Apr. 4, 2023, 4 pages.
Nokia et al. "On Wideband Operation in NR-U" 3GPP TSG RAN WG1 Meeting #97, R1-1906657, May 17 15 pages.
PCT/CN2019/096235 International Search Report dated Apr. 15, 2020, 2 pages.

* cited by examiner

FIG. 11

METHOD AND APPARATUS FOR RESOURCE ALLOCATION, AND STORAGE MEDIUM

CROSS-REFERENCE TO RELATED APPLICATION

This application is the US national application of International Application No. PCT/CN2019/096235, filed on Jul. 16, 2019, the entire contents of which are incorporated herein by reference for all purposes.

TECHNICAL FIELD

The disclosure relates to the field of communication technology, in particular to a method and an apparatus for resource allocation, and a storage medium.

BACKGROUND

In a licensed assisted access (LAA) unlicensed spectrum, a channel access mechanism of listen before talk (LBT) is adopted.

In a new radio unlicensed (NR-U) spectrum, an active bandwidth part (BWP) is configured for each terminal at the same moment by a network device such as a base station. In a scenario where the network device has multiple transmission reception points (TRP) or antenna panels, the active BWP configured for each terminal by each TRP/panel is identical. That is, the bandwidth and spectrum positions are identical, in which the bandwidth of the active BWP may be the same as the bandwidth of a component carrier (CC) at the maximum. In the NR-U spectrum, the bandwidth on each CC may be up to 100 MHz or even 400 MHz, while a bandwidth unit (BWU) for LBT channel detection is up to 20 MHz. Therefore, the active BWP for each terminal may include multiple BWUs of LBT channel detection.

In the multi-TRP/panel scenario, when the active BWP configured for each terminal includes multiple BWUs of LBT channel detection, it is a problem that needs to be solved how to reasonably allocate resources to each terminal on the multiple TRPs/panels.

SUMMARY

According to a first aspect of the disclosure, there is provided a method for resource allocation performed by a network device. The method includes determining a second bandwidth part, BWP based on idle bandwidth units, BWUs, detected by each of at least two antenna panels in a first BWP; and transmitting an indication signaling, in which the indication signaling is configured to indicate that the second BWP is taken as an active BWP, and/or to indicate a channel idle state of each BWU in the second BWP.

According to a second aspect of the disclosure, there is provided a method for resource allocation performed by a terminal. The method includes receiving an indication signaling, in which the indication signaling is configured to indicate that the second bandwidth part, BWP, is taken as an active BWP, and/or to indicate a channel idle state of each bandwidth unit, BWU, in the second BWP.

According to a third aspect of the disclosure, there is provided an apparatus for resource allocation performed by a network device. The apparatus includes a processor and a memory for storing instructions executable by the processor. The processor is configured to determine a second bandwidth part, BWP based on idle bandwidth units, BWUs, detected by each of at least two antenna panels in a first BWP; and a transmission unit configured to transmit an indication signaling, in which the indication signaling is configured to indicate that the second BWP is taken as an active BWP, and/or to indicate a channel idle state of each BWU in the second BWP.

It should be understood that the above general description and the following detailed description are only exemplary and explanatory, and cannot limit the disclosure.

BRIEF DESCRIPTION OF THE DRAWINGS

The drawings here are incorporated into the specification and constitute a part of the specification, show embodiments in accordance with the disclosure, and together with the specification are used to explain the principle of the disclosure.

DETAILED DESCRIPTION

The embodiments may be described in detail in the disclosure, the examples of which are shown in the accompanying drawings. When the following description refers to the drawings, unless otherwise indicated, the same numbers in different drawings indicate the same or similar elements. The implementations described in the following exemplary embodiments do not represent all implementations consistent with the disclosure. On the contrary, they are merely examples of apparatuses and methods consistent with some aspects of the disclosure as detailed in the appended claims.

Figure 1:
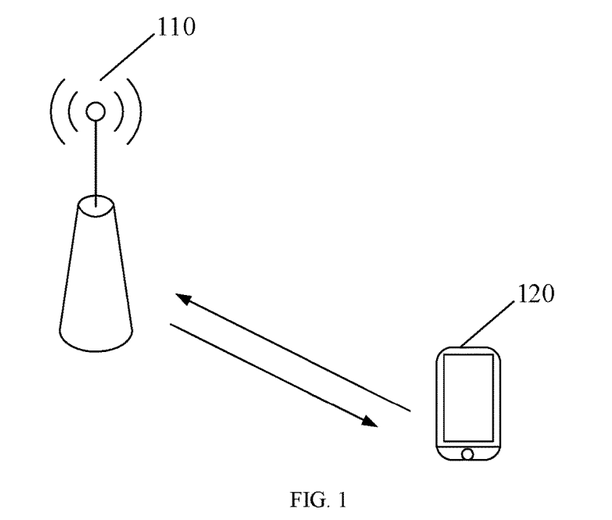
FIG. 1 is a diagram illustrating an architecture of a communication system according to some embodiments.

The method for resource allocation according to the embodiment of the disclosure may be applied to a wireless communication system 100 shown in FIG. 1. Referring to FIG. 1, the wireless communication system 100 includes a network device 110 and a terminal 120. The terminal 120 is connected to the network device 110 through wireless resources for data transmission and reception.

It may be understood that the wireless communication system 100 shown in FIG. 1 is only for schematic illustration, and the wireless communication system 100 may also include other network devices, such as a core network device, a wireless relay device, and a wireless backhaul device. etc., which are not shown in FIG. 1. The embodiment of the disclosure does not limit the number of network devices and the number of terminals included in the wireless communication system.

It may be further understood that the wireless communication system in the embodiments of the disclosure is a network that provides wireless communication functions. Different communication technologies may be used in the wireless communication system, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to factors such as the capacity, speed, and delay of different network, the network may be divided into the $2^{nd}$ generation (2G) network, the 3G network, the 4G network or future evolution network such as the 5G network. The 5G network can also be called a new radio (NR) wireless network. For the convenience of description, the wireless communication network is sometimes referred to as a network for short in the disclosure.

Further, the network device 110 involved in the disclosure may also be referred to as a wireless access network device. The wireless access network device may be a base station, an evolved base station (evolved node B), a home base station, an access point (AP) in a wireless fidelity (WIFI) system, and a wireless relay node, a wireless backhaul node, a transmission point (TP) or a transmission reception point (TRP), etc., and it may also be the gNB in the NR system, or may be a component or a part of devices that constitute(s) the base station. In addition, when it is a vehicle-to-vehicle (V2X) communication system, the network device may also be a vehicle-mounted (on board) device. It should be understood that, the specific technology and device form adopted by the network device are not limited in the embodiments of the disclosure. In the disclosure, the network device may provide communication coverage for a specific geographic area, and may communicate with terminals located in the coverage area (cell).

Further, the terminal 120 involved in the disclosure may also be referred to as a terminal device, a user equipment (UE), a mobile station (MS), a mobile terminal (MT), etc., which is a device that provides the user with voice and/or data connectivity. For example, the terminal may be a handheld device with a wireless connection function, a vehicle-mounted device, and the like. At present, some examples of terminals are smart mobile phones, pocket personal computers (PPCs), palm computers, personal digital assistants (PDAs), notebook computers, tablet computers, wearable devices, or vehicle-mounted devices, and the like.

In the embodiment of the disclosure, the network device 110 and the terminal device 120 can operate on an unlicensed spectrum. Before using the unlicensed spectrum, the network device 110 and the terminal device 120 need to adopt a channel access mechanism of listen before talk (LBT) to perform channel detection. The so-called LBT also refers to channel listening, which specifically means that the transmission node needs to listen the channel before transmitting data, and then transmits the data after the channel is successfully sensed. During the channel listening process, the TP detects a received signal strength indication (RSSI) value on the surrounding unlicensed spectrum. If the RSSI value is higher than a threshold, it means that the unlicensed spectrum is used by other surrounding devices and cannot be used temporarily by the TP. If the RSSI value is not higher than the threshold, the unlicensed spectrum is not used by other surrounding devices and can be used by the TP for data transmission.

The network device 110 may have one or more antenna panels, where some of the antenna panels among the multiple antenna panels may belong to the same transmission reception point (TRP), or may belong to different TRPs. When different antenna panels belong to different TRPs, different antenna panels can also be referred to as different TRPs. When the network device 110 has a TRP (or panel), the network device 110 cannot use an unlicensed spectrum for transmission in response to the TRP (or panel) detecting that the unlicensed spectrum channel is occupied by surrounding devices.

When the network device has multiple TRPs (or panels), the situation of using the unlicensed spectrum around each TRP (or panel) is different. For example, the unlicensed spectrum cannot be used temporarily by TRP #0 for data transmission since it may be used by other devices around the TRP #0, while the unlicensed spectrum may be used by TRP #1 for transmission since it is not used by other devices around the TRP #1. Therefore, when the network device 110 has multiple TRPs or panels, spatial diversity may be used to improve the spectrum efficiency of the unlicensed spectrum.

In the LAA unlicensed spectrum, the maximum bandwidth on each CC (that is, each cell) is 20 MHz, and the maximum bandwidth unit of LBT channel detection may be up to 20 MHz, so there is only one bandwidth unit of LBT channel detection on each CC, and the detection result on the entire CC is consistent, i.e., either the entire bandwidth is idle or the entire bandwidth is occupied by other devices.

In the NR-U, the maximum channel bandwidth of each carrier can reach 400 MHz. However, considering the capabilities of the terminal 120, the maximum bandwidth supported by the terminal 120 may be less than 400 MHz, and the terminal 120 may work on multiple small bandwidth parts (BWP). The network device 110 may configure more than one BWP for the terminal 120. In this case, the network device 110 needs to tell the terminal which BWP works on, that is, which BWP is activated. The activated BWP may be called an active BWP. The terminal 120 performs transmission on the corresponding active BWP. On the unlicensed frequency band, the network device or terminal also needs to perform channel listening before transmitting on the active BWP, and may transmit information only when the channel is idle. In the NR-U, the maximum bandwidth on each CC may be up to 100 MHz or even 400 MHz, while the bandwidth unit (BWU) of LBT channel detection is up to 20 MHz. Therefore, the active BWP for each terminal may include multiple bandwidth units of LBT channel detection.

In a scenario where the network device has multiple TRPs/panels, the active BWP configured by multiple TRPs/panels for the terminal may be identical, that is, the bandwidth and spectrum position are identical. Therefore, when the active BWP configured for the terminal includes multiple BWUs (for example, the active BWP shown in FIG. 2 includes 5 LBT channel detection BWUs), the problem here needs to be solved about how to allocate spectrum resources to the terminal by two TRPs/panels when the two TRPs/panels detect that the idle BWUs of LBT channel detection are different on the active BWP.

Figure 2:
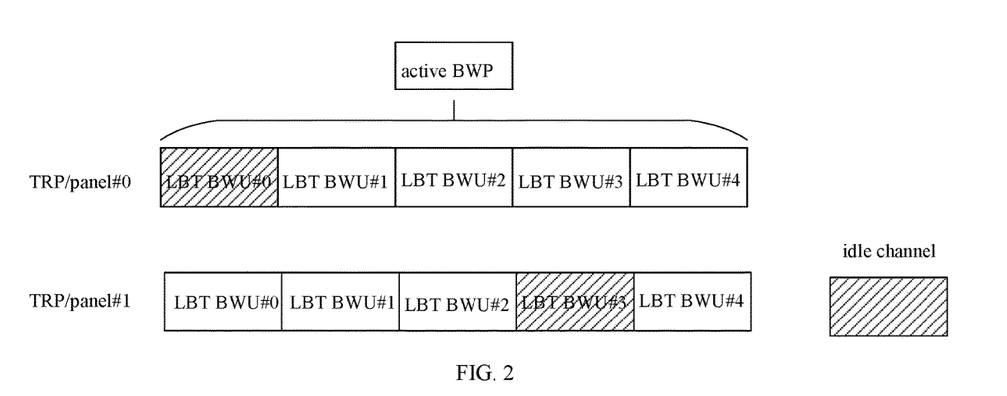
FIG. 2 is a schematic diagram illustrating a multi-antenna panel detecting an idle bandwidth unit (BWU) according to some embodiments.

It should be noted that, the 5 BWUs shown in FIG. 2 are those included in the active BWP of a certain terminal, while the bandwidth of the network device on the CC may be much larger than the 5 BWUs. For example, the CC of the network device also includes multiple BWUs with lower frequencies than BWU #0 on the left side of BWU #0, and multiple BWUs with higher frequencies than BWU #4. These BWUs not shown may be BWUs on the active BWP of other terminals. Here, the disclosure provides the channel detection result of the BWU included in the active BWP of a certain terminal.

In view of this, the disclosure provides a method for resource allocation. When the network device has multiple antenna panels, an idle BWU is detected on a part of LBT BWUs in the current active BWP of a certain terminal, so as to achieve that the base station allocates resources for the terminal reasonably on the multiple panel antennas.

Figure 3:
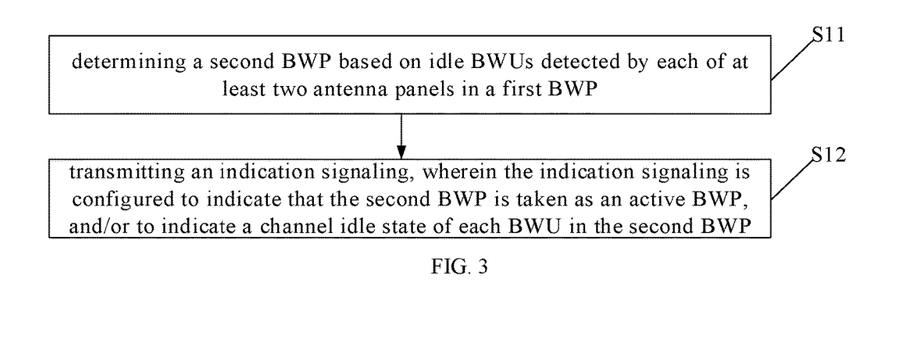
FIG. 3 is a flowchart illustrating a method for resource allocation according to an embodiment.

FIG. 3 is a flowchart illustrating a method for resource allocation according to an embodiment. As shown in FIG. 3, the method for resource allocation is used in a network device and includes the following steps.

At S11, a second BWP is determined based on idle BWUs detected by each of at least two antenna panels in a first BWP.

The network device in the disclosure has multiple antenna panels, and the multiple antenna panels have at least two antenna panels. Each of the at least two antenna panels performs channel detection. The different antenna panels may belong to the same TRP or different TRPs. When the different antenna panels belong to different TRPs, the channel detection performed by the antenna panels in the disclosure may also be understood as the TRPs performing respective channel detection.

In the disclosure, the first BWP refers to the BWP where each antenna panel performs channel detection. The first BWP may be the entire bandwidth part of the network device on this carrier. Each antenna panel of the network device performs LBT channel detection on the first BWP to detect whether the LBT BWU in the first BWP is an idle BWU. The process of channel detection by each antenna panel can adopt existing technology, which will not be described in detail in the disclosure.

In the disclosure, when each antenna panel detects an idle BWU in the LBT BWU of the first BWP, the network device reasonably allocates resources to the terminal on the multiple antenna panels, for example, re-determining an active BWP based on the detected idle BWUs.

In the disclosure, the active BWP that is re-determined based on the idle BWUs detected by each of the at least two antenna panels in the first BWP is called the second BWP.

At S12, an indication signaling is transmitted, in which the indication signaling is configured to indicate that the second BWP is taken as an active BWP, and/or to indicate a channel idle state of each BWU in the second BWP.

On the one hand, when the second BWP in the disclosure is different from the active BWP currently used by the terminal, the network device transmits the indication signaling to the terminal for instructing the second BWP to be the active BWP, so that the terminal determines the second BWP as a new active BWP and switches the current active BWP to the second BWP. On the other hand, when the second BWP in the disclosure is the same as the active BWP currently used by the terminal, the network device does not need to transmit the indication signaling for switching the active BWP to the terminal.

In the disclosure, the indication signaling is configured to indicate that the second BWP is taken as the active BWP, the network device transmits a downlink resource scheduling instruction to the terminal. The downlink resource scheduling instruction is configured to schedule the terminal to receive downlink information through a resource block (RB). In the disclosure, the first downlink resource scheduling instruction refers to the downlink resource scheduling instruction for scheduling the terminal to receive downlink information through the RBs.

Figure 4:
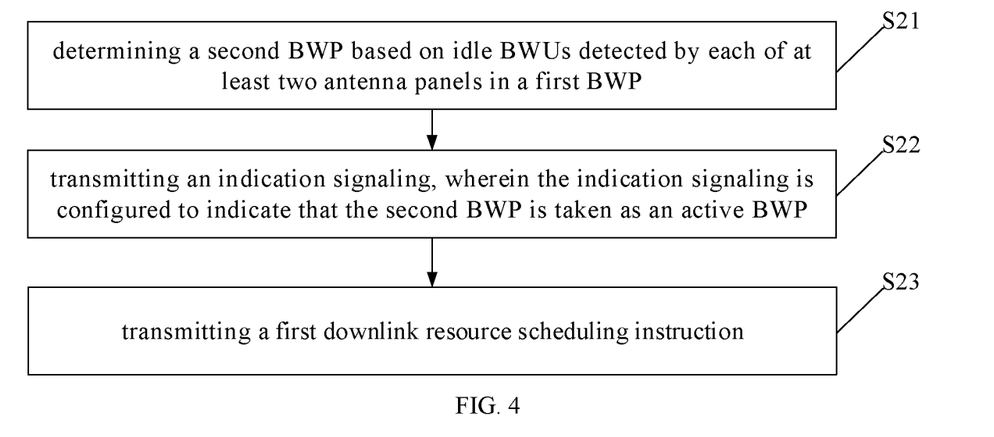
FIG. 4 is a flowchart illustrating another method for resource allocation according to an embodiment.

FIG. 4 is a flowchart illustrating another method for resource allocation according to an embodiment. Referring to FIG. 4, the method includes the following steps.

At S21, a second BWP is determined based on idle BWUs detected by each of at least two antenna panels in a first BWP.

At S22, an indication signaling is transmitted, in which the indication signaling is configured to indicate that the second BWP is taken as an active BWP.

At S23, a first downlink resource scheduling instruction is transmitted. The first downlink resource scheduling instruction is configured to schedule a resource block (RB) for the terminal to receive downlink information.

In the disclosure, the downlink information may be one or a combination of the following information: a downlink reference signal, a synchronization signal block, a discovery reference signal, information carried in a physical downlink control channel (PDCCH), and information carried in a physical downlink share channel (PDSCH).

Further, in the above embodiments of the disclosure, the indication signaling is configured to indicate that the second BWP is taken as the active BWP, but not indicate the channel idle state of each BWU in the second BWP. In this case, the terminal defaults that each BWU in the second BWP is idle. When the network device transmits the first downlink resource scheduling instruction, it needs to avoid RBs in the BWU where the channel is not idle, and only schedules RBs in the idle BWU for transmission of the downlink information to the terminal.

In the disclosure, when the indication signaling is configured to indicate the channel idle state of each BWU in the second BWP, or when the indication signaling is configured to indicate that the second BWP is taken as the active BWP and indicate the channel idle state of each BWU in the second BWP, the network device transmits a downlink resource scheduling instruction to the terminal, in which the downlink resource scheduling instruction is configured to schedule the terminal to receive downlink information through RBs belonging to BWUs in an idle state, instead of receiving the downlink information through RBs belonging to BWUs in a non-idle state.

In the disclosure, a second downlink resource scheduling instruction refers to a downlink resource scheduling instruction for scheduling the terminal to receive downlink information through the RBs belonging to the BWUs in the idle state and not to receive the downlink information through the RBs belonging to the BWUs in the non-idle state.

Figure 5:
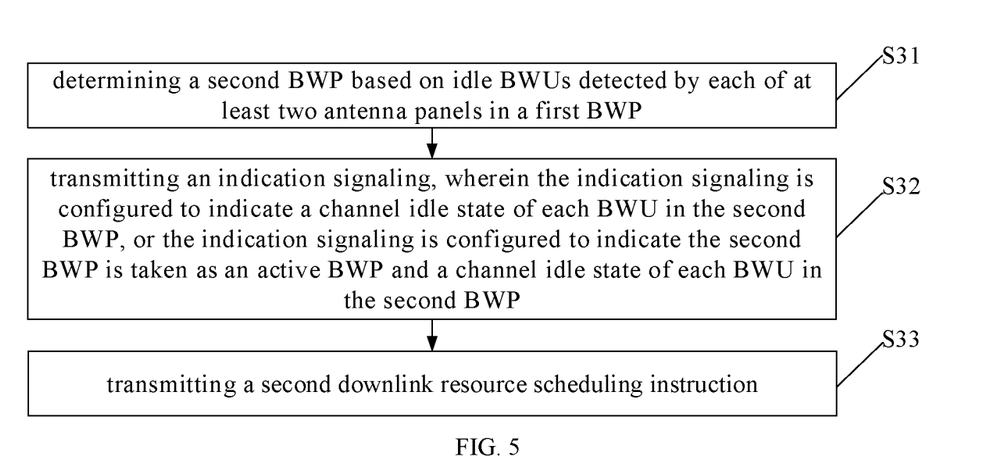
FIG. 5 is a flowchart illustrating yet another method for resource allocation according to an embodiment.

FIG. 5 is a flowchart illustrating another method for resource allocation according to an embodiment. Referring to FIG. 5, the method includes the following steps.

At S31, a second BWP is determined based on idle BWUs detected by each of at least two antenna panels in a first BWP.

At S32, an indication signaling is transmitted, in which the indication signaling is configured to indicate a channel idle state of each BWU in the second BWP, or the indication signaling is configured to indicate that the second BWP is taken as the active BWP and a channel idle state of each BWU in the second BWP.

In the disclosure, when the indication signaling indicates the channel idle state of each BWU in the second BWP, the indication signaling includes the channel idle state set for each BWU in the second BWP, in which the channel idle state is configured to indicate whether the channel of the BWU is idle. The disclosure indicates a channel idle state for each BWU, or indicates multiple states for each antenna panel. That is, the number of channel idle states corresponding to each BWU is 1, or the number of channel idle states corresponding to each BWU is N, where N is a positive integer being less than or equal to the number of antenna panels included in the network device. When the indication information sets a channel idle state for each BWU, the BWU is considered to be idle as long as one of the multiple antenna panels of the network device detects that the BWU is idle; otherwise, the BWU is busy. Alternatively, when the indication information sets a channel idle state for each BWU, the BWU is considered to be idle when all the antenna panels of the network device detect that the BWU is idle; otherwise, the BWU is busy. When the number of channel idle states corresponding to each BWU is N being less than or equal to the number of antenna panels provided for the terminal by the network device. For example, the network device has 3 antenna panels, but only 2 antenna panels are provided for the terminal to perform transmission, then each BWU corresponds to 2 channel idle states. That is, each idle state actually indicates a channel detection result of each antenna panel.

At S33, a second downlink resource scheduling instruction is transmitted. The second downlink resource scheduling instruction is configured to schedule the terminal to receive downlink information through the RBs belonging to the BWU in the idle state, and not to receive downlink information through the RBs belonging to the BWU in the non-idle state.

Through the above-mentioned embodiments of the disclosure, it is achieved that in a scenario where a network device has multiple antenna panels, an active BWP is configured for the terminal on the multiple antenna panels and resources are allocated for the terminal.

Further, in the above-mentioned embodiments of the disclosure, when the indication signaling is configured to indicate the channel idle state of each BWU in the second BWP, it is equivalent that the network device indicates the idle BWUs detected by each antenna panel, so that the terminal which has received the indication signaling can also determine the busy BWUs and the idle BWUs detected by each antenna panel. Therefore, the network device does not need to avoid non-idle BWUs when scheduling RBs. That is, for the convenience of scheduling the signaling, the RBs in both the idle BWUs and the non-idle BWUs may be scheduled to the terminal at the same time. In fact, the network device only transmits the downlink information through the RBs of the idle BWUs rather than through the RBs of the non-idle BWUs. Accordingly, the terminal only needs to receive the downlink information through the corresponding RB the idle BWUs rather than through the corresponding RB the non-idle BWUs based on the channel idle state of each BWU indicated by the indication signaling. For example, when the second BWP contains BWU #0, BWU #1, BWU #2, in which the BWU #0 and BWU #2 are detected to be idle while the BWU #1 is not detected to be idle, the network device allocates RBs in the three consecutive BWUs during the process of allocating the RB resources in the frequency spectrum, in which the instruction signaling for indicating resource allocation may include the RBs of the BWU #0, BWU #1 and BWU #2, but the network device may not transmit data through the RBs of the BWU #1. Furthermore, the terminal does not need to receive data in the BWU #1 during the reception. In the disclosure, for signaling unification, the network device may also schedule the RB of the busy BWU to the terminal, while the terminal does not receive data in the busy BWU or performs rate matching operations in the busy BWU.

Further, in the disclosure, the network device determines the active BWP in different methods according to different channel detection results obtained by LBT BWU detection of each antenna panel in the first BWP. The following will describe different processing methods for different channel detection results in combination with practical applications.

In an embodiment, the idle BWUs detected by each of the at least two antenna panels in the first BWP includes identical BWUs.

The idle BWU includes identical BWUs in two examples: In example 1, the idle BWUs detected by each antenna panel in the first BWP are exactly identical, that is, the detection result of each panel antenna is identical for the active BWP of a certain terminal. For example, in FIG. 2, the idle BWUs detected by TRP/panel #0 are BWU #0 and BWU #1, and the idle BWUs detected by TRP/panel #1 are also BWU #0 and BWU #1. In example 2, a part of idle BWUs detected by the antenna panels in the first BWP are identical. For example, in FIG. 2, the idle BWUs detected by TRP/panel #0 are BWU #0 and BWU #1, and the idle BWU detected by TRP/panel #1 is BWU #0.

In the disclosure, when the idle BWUs includes the identical BWUs, in determining the second BWP, one or more BWUs are selected as a first subset of BWUs from a first set of BWUs composed of the identical BWUs, and the second BWP is determined based on the first subset of BWUs. When the second BWP is determined based on the first subset of BWUs, the second BWP is determined based on spectrum position continuity of each BWU in the first subset of BWUs. For example, when the first subset of BWUs includes BWUs with consecutive spectrum positions, the BWUs with consecutive spectrum positions in the first subset of BWUs are determined as the second BWP. When the first subset of BWUs includes BWUs with inconsecutive spectrum positions, the second BWP is preliminarily determined based on the BWUs with consecutive spectrum positions in the first subset of BWUs. BWUs with inconsecutive spectrum positions are added to the preliminarily determined second BWP, so as to obtain a finally determined second BWP, where the number of idle BWUs is greater than or equal to the number of busy BWUs in the added BWUs.

The implementation of determining the second BWP in the two examples where the idle BWUs includes the identical BWUs may be described below in the disclosure.

In example 1, the idle BWUs detected by each antenna panel in the first BWP is exactly identical.

In an example, when the detected multiple idle BWUs include consecutive BWUs in the spectrum positions, and the detected multiple idle BWUs are all BWUs with consecutive spectrum positions, the multiple BWUs with consecutive spectrum positions are configured as the second BWP.

When the second BWP combined by the multiple consecutive BWUs is different from the current active BWP of the terminal, the network device needs to transmit an indication signaling for instructing the second BWP as the active BWP, so that the terminal can determine a new active BWP and switch the current active BWP to the new active BWP (i.e., the second BWP).

In another example, when the detected multiple idle BWUs include BWUs with consecutive spectrum positions and BWUs with inconsecutive spectrum positions, the multiple BWUs with consecutive spectrum positions are configured as the second BWP, and the BWUs with inconsecutive spectrum positions are discarded.

Of course, certain criteria may also be set for allocation in the disclosure, for example, so as to allocate the idle BWUs to different terminals as evenly as possible. At this time, the network device in the disclosure needs to transmit an indication signaling for indicating a new active BWP of the terminal.

In another example, when the detected multiple idle BWUs include BWUs with consecutive spectrum positions and BWUs with inconsecutive spectrum positions, the second BWP is preliminarily determined based on BWUs with consecutive spectrum positions in the first subset of BWUs. BWUs whose spectrum positions are not consecutive with the preliminarily determined second BWP are added to the preliminarily determined second BWP, so as to obtain a finally determined second BWP. The number of idle BWUs is greater than or equal to the number of busy BWUs in the added BWUs, so that the idle BWUs are included in the active BWP as much as possible, but few busy BWUs are not included in the active BWP as possible. For example, when the idle BWUs are BWU #0 and BWU #4, it is not necessary to configure BWU #0 to BWU #4 in the active BWP in order to use BWU #0 and BWU #4 at the same time. In this case, there are only 2 idle BWUs and 3 busy BWUs that cannot be used in the active BWP, which leads to a large bandwidth of the terminal filter and increases power consumption. For another example, when the idle BWUs are BWU #0, BWU #1, BWU #2, and BWU #4, BWU #0-BWU #2 may be preliminarily determined as the second BWP and these 5 BWUs may be further configured as the second BWP in order to add the BWU #4. In this way, the number of added non-idle BWUs is equal to the number of newly added idle BWUs. That is to say, there are 4 idle BWUs and 1 busy BWU that cannot be used in the active BWP at the same time, i.e., the number of idle BWUs is greater than or equal to the number of busy BWUs.

In another example, when the detected multiple idle BWUs are multiple BWUs with inconsecutive spectrum positions, one of the multiple BWUs with inconsecutive spectrum positions may be used for preliminary determination of the second BWP in the disclosure, and the second BWP is determined in the same processing method as the above example when the multiple idle BWUs detected include BWUs with consecutive spectrum positions and BWUs with inconsecutive spectrum positions. In particular, a BWU is selected from the BWUs with inconsecutive spectrum positions as the preliminarily determined second BWP. BWUs whose spectrum positions are not consecutive with the preliminarily determined second BWP are added to the preliminarily determined second BWP, so as to obtain a finally determined second BWP. The added BWUs include more idle BWUs than busy BWUs.

In the disclosure, on the one hand, when there is a busy BWU in the finally determined second BWP, which is obtained by adding the BWUs with inconsecutive spectrum positions to the preliminarily determined second BWP, the network device transmits indication information configured to indicate the channel idle state of each BWU in the second BWP, so that the terminal can determine the idle BWUs and the busy BWUs. On the other hand, when it is predefined that the BWUs included in the second BWP of the terminal are all idle BWUs by default, the network device does not need to transmit additional indication information configured to indicate the channel idle state of each BWU in the second BWP. When there are BWUs with non-idle channels actually in the second BWP, the network device may not schedule the RB resources of the BWUs whose channels are non-idle to the terminal during scheduling.

When the second BWP is different from the current active BWP, the network device needs to transmit an indication signaling for indicating that the second BWP is taken as a new active BWP.

When the second BWP is different from the current active BWP and the second BWP contains a busy BWU, the network device needs to transmit an indication signaling for indicating that the second BWP is taken as the new active BWP, or the network device may transmit an indication signaling for indicating a channel idle state of each BWU in the second BWP.

When the second BWP is the same as the current active BWP and the second BWP contains a busy BWU, the network device does not need to transmit an indication signaling for indicating that the second BWP is taken as the new active BWP, but the network device may transmit an indication signaling for indicating a channel idle state of each BWU in the second BWP.

In example 2: a part of idle BWUs detected by the antenna panels in the first BWP are identical.

In the disclosure, when a part of the idle BWUs detected by each antenna panel in the first BWP are identical and a part of the idle BWUs are different, the identical idle BWUs detected by each antenna panel are taken as a first set of BWUs, one or more BWUs are selected from the first set of BWUs as a first subset of BWUs, and the second BWP is determined based on the first subset of BWUs. In other words, when the idle BWUs detected by each antenna panel in the first BWP includes a part of identical idle BWUs and a part of different idle BWUs in the disclosure, the second BWP is determined by using a subset of intersection of the idle BWUs detected by each antenna panel, so that the second BWP configured by each antenna panel is identical. For example, in FIG. 2, the idle BWUs detected by TRP/panel #0 are BWU #0 and BWU #1, and the idle BWU detected by TRP/panel #1 is BWU #0, BWU #0 is then determined as the second BWP. It may be understood that in the disclosure, when the subset of intersection of the idle BWUs detected by each antenna panel includes more than one BWU, the second BWP is determined based on spectrum position continuity of each BWU in the first subset of BWUs. For example, the second BWP is determined based on BWUs with consecutive spectral positions in the first subset of BWUs. Alternatively, the second BWP is preliminarily determined based on the BWUs with consecutive spectrum positions in the first subset of BWUs, and BWUs with inconsecutive spectrum positions are added to the preliminarily determined second BWP to obtain the finally determined second BWP. The number of idle BWUs is greater than or equal to the number of busy BWUs in the added BWUs.

It may be understood that in this example, when the second BWP is different from the current active BWP, the network device needs to transmit an indication signaling for indicating the second BWP is taken as the new active BWP. When the second BWP is different from the current active BWP and a busy BWU is included in the second BWP, the network device needs to transmit an indication signaling for indicating that the second BWP is taken as the new active BWP, or the network device may transmit indicating information for indicating the channel idle state of each BWU in the second BWP. When the busy BWU is included in the second BWP, the network device may transmit the indication information for indicating the channel idle state of each BWU in the second BWP, so that the terminal can determine the idle BWUs and the busy BWUs. For example, when the second BWP is the same as the current active BWP and the busy BWU is included in the second BWP, the network device does not need to transmit an indication signaling for indicating that the second BWP is taken as the new active BWP but the network device may transmit the indication information for indicating the channel idle state of each BWU in the second BWP. When it is predefined that the BWUs included in the second BWP of the terminal are all idle BWUs by default, the network device does not need to transmit additional indication information configured to indicate the channel idle state of each BWU in the second BWP. When there are BWUs with non-idle channels actually in the second BWP, the network device may not schedule the RB resources of the BWUs whose channels are non-idle to the terminal during scheduling.

In another embodiment, the idle BWUs detected by each of the at least two antenna panels in the first BWP includes different BWUs.

In the disclosure, when the idle BWUs includes different BWUs, it is possible that the idle BWUs includes some different BWUs, or includes completely different BWUs.

In the disclosure, when the idle BWUs detected by each antenna panel in the first BWP include different BWUs, the second BWP is determined in two implementations.

In the first implementation, one or more BWUs are selected as a second subset of BWUs from a second set of BWUs composed of all the idle BWUs detected by each antenna panel in the first BWP, and the second BWP is determined based on the second subset of BWUs, so as to use the idle BWUs detected by each antenna panel as much as possible. In the disclosure, the second set of BWUs may be understood as a union of the idle BWUs detected by each antenna panel. The second subset of BWUs may be understood as a subset of the union of the idle BWUs detected by each antenna panel. The number of BWUs in the second subset of BWUs may be one or more. For example, the maximum number of BWUs in the second subset of BWUs may be all the BWUs whose channels are detected to be idle by each antenna panel.

It may be understood that when the second BWP is determined based on the second subset of BWUs in the disclosure, when the second BWP is different from the current active BWP, the network device needs to transmit an indication an indication signaling for indicating the second BWP is taken as a new active BWP. When the second BWP is different from the current active BWP and a busy BWU is included in the second BWP, the network device needs to transmit an indication signaling for indicating that the second BWP is taken as the new active BWP, or the network device may transmit indicating information for indicating a channel idle state of each BWU in the second BWP. When the busy BWU is included in the second BWP, the network device may transmit indication information for indicating the channel idle state of each BWU in the second BWP, so that the terminal can determine the idle BWUs and the busy BWUs. For example, when the second BWP is the same as the current active BWP and the busy BWU is included in the second BWP, the network device does not need to transmit an indication signaling for indicating that the second BWP is taken as the new active BWP but the network device may transmit the indication information for indicating the channel idle state of each BWU in the second BWP. When it is predefined that the BWUs included in the second BWP of the terminal are all idle BWUs by default, the network device does not need to transmit additional indication information for indicating the channel idle state of each BWU in the second BWP. At this time, the network device does not schedule the RB resources of the non-idle BWUs to transmit downlink information to the terminal during resource scheduling.

In the second implementation, one or more BWUs are selected as a third subset of BWUs from a third set of BWUs composed of all the idle BWUs detected by a designated antenna panel of respective antenna panels in the first BWP, and the second BWP is determined based on the third subset of BWUs. The designated antenna panel detects the largest number of idle BWUs, and the idle BWUs has optimal spectrum position continuity. In this way, the second BWP is determined mainly by the designated antenna panel. In this case, the network device deactivates other antenna panels except for the designated antenna panel in the antenna panels, and transmits a deactivation signaling. The deactivation signaling may be a medium access control (MAC) signaling. For example, in FIG. 2, when the number of idle BWUs detected by TRP/panel #0 is relatively large and consecutive, the TRP/panel #0 is designated in configuring the second BWP, for example, the TRP/panel #0 is used to serve the terminal and the TRP/Panel #1 is deactivated. By using the MAC signaling to deactivate TRP/panel #1, the terminal knows that it does not need to receive the downlink transmission from TRP/panel #1. Alternatively, in this embodiment, the network device transmits a downlink resource scheduling instruction which characterizes a transmission configuration indication (TCI) state of the designated antenna panel and does not characterize TCI states of other antenna panels (other than the designated antenna panel), hereinafter referred to as a third downlink resource scheduling instruction. The third downlink resource scheduling instruction may indicate the TCI state of the designated antenna panel, and does not indicate the TCI states of antenna panels other than the designated antenna panel. The terminal detects that only the TCI state of the designated antenna panel is included in the third downlink resource scheduling instruction, can determine a receiving beam corresponding to the designated antenna panel and receive the downlink information based on the receiving beam corresponding to the designated antenna panel.

When there are completely different BWUs among the idle BWUs detected by each antenna panel in the first BWP, the designated antenna panel is an antenna panel that detects idle BWUs in response to the antenna panel detecting the idle BWUs and the other antenna panels except the antenna panel not detecting the idle BWUs.

In the disclosure, when resource allocation is performed, the new active BWP of the terminal is determined according to a spectrum position relationship of the idle BWUs detected by each antenna panel, and resource allocation is performed, which can improve spectrum efficiency while reducing power consumption of the terminal.

Figure 6:
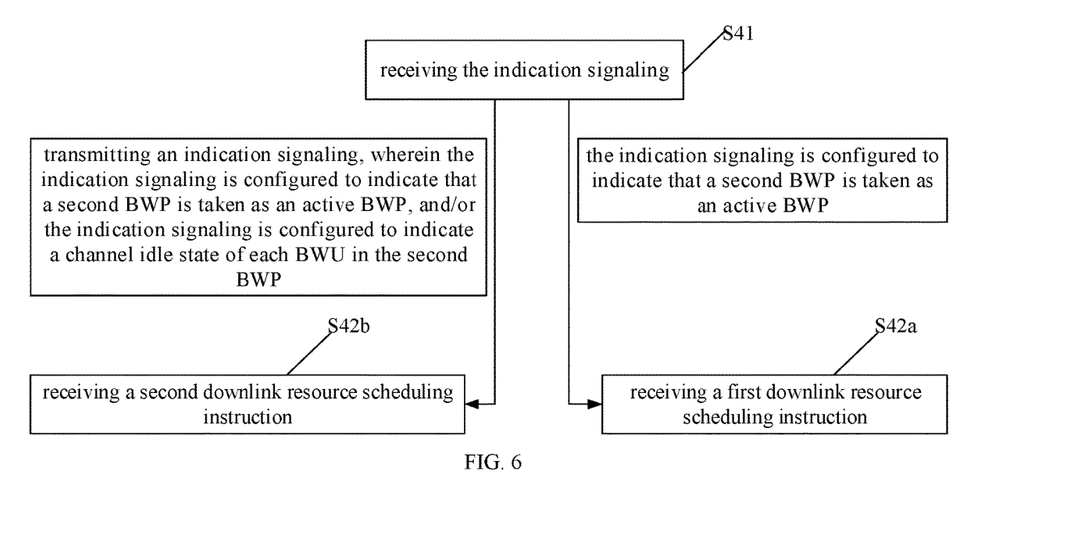
FIG. 6 is a flowchart illustrating yet another method for resource allocation according to an embodiment.

FIG. 6 is a flowchart illustrating yet another method for resource allocation according to an embodiment. The method for resource allocation shown in FIG. 6 is applied to a terminal and includes the following steps.

At S41, an indication signaling is received. The indication signaling is configured to indicate that the second BWP is taken as an active BWP, and/or configured to indicate a channel idle state of each BWU in the second BWP.

When the indication signaling is configured to indicate the channel idle state of each BWU in the second BWP, the indication signaling includes the channel idle state set for each BWU in the second BWP. The channel idle state is configured to characterize whether a channel of the BWU is idle. The number of channel idle states corresponding to each BWU is 1, or the number of channel idle states corresponding to each BWU is N, where N is a positive integer being less than or equal to the number of antenna panels of the network device.

The indication signaling is configured to indicate that the second BWP is taken as the activated/active BWP, and the method for resource allocation shown in FIG. 6 further includes the following steps S42a-S42b.

At S42a, a first downlink resource scheduling instruction is received, and downlink information is received through RBs scheduled by the first downlink resource scheduling instruction. Since the indication signaling does not indicate the channel idle state of each BWU in the second BWP, the terminal defaults that each BWU in the active BWP is idle. When there are channel non-idle BWUs in the second BWP in fact, the network device needs to avoid these channel non-idle BWUs during scheduling, that is, RBs in the non-idle BWUs are not scheduled for transmission of the downlink information to the terminal.

The indication signaling is configured to indicate the channel idle state of each BWU in the second BWP, or the indication signaling is configured to indicate that the second BWP is taken as the active BWP and the channel idle state of each BWU in the second BWP, the method for resource allocation also includes the following steps, as shown in FIG. 6.

At S42b, a second downlink resource scheduling instruction is received, and the downlink information is received through RBs of BWUs in the idle state scheduled by the second downlink resource scheduling instruction, and is not received through RBs of BWUs in the non-idle state. Since the indicator signaling includes the channel idle state of each BWU on the second BWP, that is, for the unity of the scheduling signaling, the idle BWUs and the non-idle BWUs together form a second BWP with consecutive spectrum, the scheduling signaling indicates the RBs of the idle BWUs and also indicates the RBs of the channel non-idle BWUs. According to the RBs indicated by the scheduling signaling and the channel idle state of each BWU, the terminal determines that it is necessary to receive downlink information through the RBs of the idle BWUs, and not to receive the downlink information through the RBs of the channel non-idle BWUs.

Furthermore, in the disclosure, the terminal may also receive a deactivation signaling. The deactivation signaling is configured to deactivate other antenna panels except a designated antenna panel among the antenna panels. Alternatively, the terminal may also receive a third downlink resource scheduling instruction. The third downlink resource scheduling instruction is configured to characterize a TCI state of the designated antenna panel and not characterize TCI states of the other antenna panels except the designated antenna panel.

In the disclosure, not sufficiently detailed description on the method for resource allocation performed by the terminal may refer to the relevant description in the foregoing embodiments, which will not be repeated here.

Figure 7:
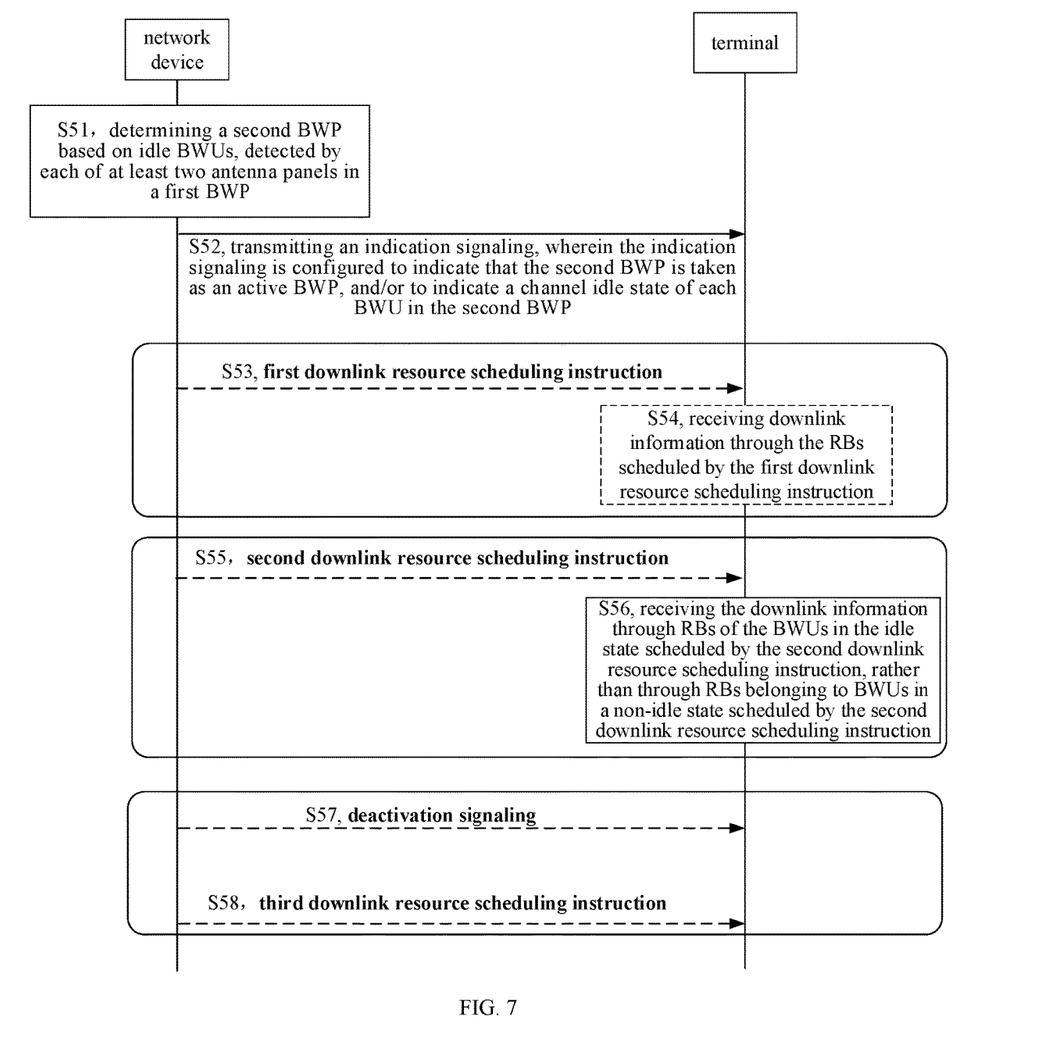
FIG. 7 is a flowchart illustrating yet another method for resource allocation according to an embodiment.

FIG. 7 is a flowchart illustrating yet another method for resource allocation according to an embodiment. The method for resource allocation shown in FIG. 7 is applied to an interaction process between a terminal and a network device, and includes the following steps.

At S51, the network device determines a second BWP based on idle BWUs detected by each of at least two antenna panels in a first BWP.

At S52, the network device transmits an indication signaling. The indication signaling is configured to indicate that the second BWP is taken as an active BWP, and/or to indicate a channel idle state of each BWU in the second BWP. The terminal receives the indication signaling.

When the indication signaling is configured to indicate that the second BWP is taken as the active BWP, step S53 and step S54 are performed.

At S53, the network device transmits a first downlink resource scheduling instruction. The first downlink resource scheduling instruction is configured to schedule RBs for the terminal to receive downlink information. The terminal receives the first downlink resource scheduling instruction.

At S54, the terminal receives downlink information through the RBs scheduled by the first downlink resource scheduling instruction.

When the indication signaling is configured to indicate the channel idle state of each BWU in the second BWP, or the indication signaling is configured to indicate that the second BWP is taken as the active BWP and the channel idle state of each BWU in the second BWP, step S55 and step S56 are performed.

At S55, the network device transmits a second downlink resource scheduling instruction. The second downlink resource scheduling instruction is configured to schedule the terminal to receive downlink information through RBs belonging to BWUs in an idle state rather than through RBs belonging to BWUs in a non-idle state. The terminal receives the second downlink resource scheduling instruction.

At S56, the terminal receives downlink information through RBs of the BWUs in the idle state scheduled by the second downlink resource scheduling instruction, rather than through RBs belonging to BWUs in a non-idle state scheduled by the second downlink resource scheduling instruction.

At S57, the network device transmits a deactivation signaling. The deactivation signaling is configured to deactivate other antenna panels except a designated antenna panel among the antenna panels. The terminal receives the deactivation signaling, and receives data transmitted by the designated antenna panel but does not receive data transmitted by other antenna panels.

At S58, the network device transmits a third downlink resource scheduling instruction. The third downlink resource scheduling instruction characterizes a TCI state of the designated antenna panel, and does not characterizes TCI states of other antenna panels except the designated antenna panel. The terminal receives the third downlink resource scheduling instruction, and receives a beam transmitted by the designated antenna panel but does not receive a beam transmitted by other antenna panels.

In the disclosure, the not sufficiently detailed description on the method for resource allocation performed by the network device and the terminal in interaction may refer to the relevant description in the foregoing embodiment, which will not be repeated here.

Based on the same concept, embodiments of the disclosure also provide an apparatus for resource allocation.

It may be understood that, in order to realize the above-mentioned functions, the apparatus for resource allocation in the embodiments of the disclosure includes hardware structures and/or software modules corresponding to each function. In combination with the units and algorithm steps of the examples disclosed in the embodiments of the disclosure, the embodiments of the disclosure may be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions in the embodiments of the disclosure.

Figure 8:
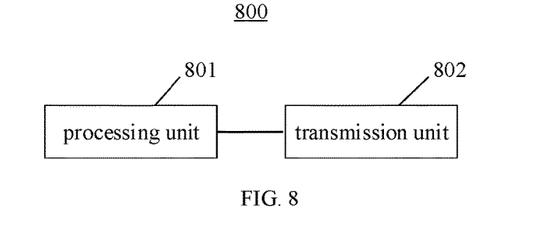
FIG. 8 is a block diagram illustrating an apparatus for resource allocation according to an embodiment.

FIG. 8 is a block diagram illustrating an apparatus for resource allocation 800 according to an embodiment. Referring to FIG. 8, the apparatus 800 is applied to a network device, and includes a processing unit 801 and a transmission unit 802.

The processing unit 801 is configured to determine a second bandwidth part, BWP based on idle bandwidth units, BWUs, detected by each of at least two antenna panels in a first BWP. The transmission unit 802 is configured to transmit an indication signaling, in which the indication signaling is configured to indicate that the second BWP is taken as an active BWP, and/or to indicate a channel idle state of each BWU in the second BWP.

In an embodiment, the idle BWUs detected by each of the at least two antenna panels in the first BWP includes identical BWUs. The processing unit 801 is configured to select one or more BWUs as a first subset of BWUs from a first BWU set composed of the identical BWUs, and determine the second BWP based on the first subset of BWUs.

In another embodiment, the processing unit 801 is configured to determine the second BWP based on the first subset of BWUs by: determining the second BWP based on spectrum position continuity of each BWU in the first subset of BWUs.

In another embodiment, the first subset of BWUs includes BWUs with consecutive spectral positions; and the processing unit 801 is configured to determine the second BWP based on spectrum position continuity of each BWU in the first subset of BWUs by: determining the second BWP based on the BWUs with consecutive spectrum positions in the first subset of BWUs.

In another embodiment, the first subset of BWUs includes BWUs with inconsecutive spectrum positions; and the processing unit 801 is configured to determine the second BWP based on spectrum position continuity of each BWU in the first subset of BWUs by: preliminarily determining a second BWP based on BWUs with consecutive spectrum positions in the first subset of BWUs; and obtaining a finally determined second BWP by adding BWUs whose spectrum positions are not consecutive with the preliminarily determined second BWP to the preliminarily determined second BWP, in which a number of idle BWUs is greater than or equal to a number of busy BWUs in the added BWUs.

In yet another embodiment, the idle BWUs detected by each of the at least two antenna panels in the first BWP include different BWUs; and the processing unit 801 is configured to select one or more BWUs as a second subset of BWUs from a second set of BWUs composed of all the idle BWUs detected by each antenna panel in the first BWP, and determining the second BWP based on the second subset of BWUs.

In yet another embodiment, the idle BWUs detected by each of the at least two antenna panels in the first BWP include different BWUs; and the processing unit 801 is configured to select one or more BWUs as a third subset of BWUs from a third set of BWUs composed of all the idle BWUs detected by a designated antenna panel of the antenna panels in the first BWP, and determining the second BWP based on the third sub set of BWUs.

In another embodiment, a number of idle BWUs detected by the designated antenna panel is the largest, and the idle BWUs have optimal spectrum position continuity.

In another embodiment, the indication signaling includes the channel idle state set for each BWU in the second BWP, and the channel idle state is configured to characterize whether a channel of the BWU is idle; a number of channel idle states corresponding to each BWU is 1, or the number of channel idle states corresponding to each BWU is N, where N is a positive integer being less than or equal to a number of antenna panels of the network device.

In another embodiment, the indication signaling is configured to indicate that the second BWP taken as the active BWP, and the transmission unit 802 is further configured to: transmit a first downlink resource scheduling instruction, wherein the first downlink resource scheduling instruction is configured to schedule resource blocks, RBs, for the terminal to receive downlink information.

In another implementation manner, the indication signaling is configured to indicate the channel idle state of each BWU in the second BWP, or the indication signaling is configured to indicate that the second BWP is taken as the active BWP and the channel idle state of each BWU in the second BWP. The transmission unit 802 is further configured to: transmit a second downlink resource scheduling instruction, in which the second downlink resource scheduling instruction is configured to schedule the terminal to receive downlink information through resource blocks, RBs, belonging to BWUs in an idle state, and not to receive downlink information through RBs belonging to BWUs in a non-idle state.

In another embodiment, the processing unit 801 is further configured to: deactivate other antenna panels except the designated antenna panel among the antenna panels, and transmitting a deactivation signaling; or the transmission unit 802 is further configured to transmit a third downlink resource scheduling instruction, in which the third downlink resource scheduling instruction is configured to characterize a transmission configuration indication, TCI, state of the designated antenna panel, and not characterize TCI states of the other antenna panels except the designated antenna panel.

Figure 9:
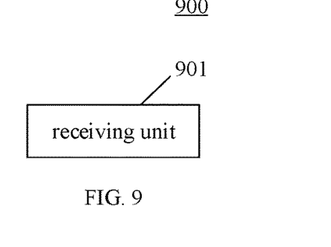
FIG. 9 is a block diagram illustrating an apparatus for resource allocation according to an embodiment.

FIG. 9 is a block diagram illustrating an apparatus for resource allocation 900 according to an embodiment. Referring to FIG. 9, the device 900 is applied to a terminal and includes a receiving unit 901. The receiving unit 901 is configured to receive an indication signaling, wherein the indication signaling is configured to indicate that the second bandwidth part, BWP, is taken as an active BWP, and/or to indicate a channel idle state of each bandwidth unit, BWU, in the second BWP.

In an embodiment, the indication signaling includes the channel idle state set for each BWU in the second BWP, and the channel idle state is configured to characterize whether a channel of the BWU is idle. A number of channel idle states corresponding to each BWU is 1, or the number of channel idle states corresponding to each BWU is N, where N is a positive integer being less than or equal to a number of antenna panels of a network device.

In another embodiment, the indication signaling is configured to indicate that the second BWP is taken as the active BWP, and the receiving unit 901 is further configured to receive a first downlink resource scheduling instruction; and receive downlink information through RBs scheduled by the first downlink resource scheduling instruction.

In another embodiment, the indication signaling is configured to indicate the channel idle state of each BWU in the second BWP, or the indication signaling is configured to indicate that the second BWP is taken as the active BWP and the channel idle state of each BWU in the second BWP. The receiving unit 901 is further configured to: receive a second downlink resource scheduling instruction; and receive downlink information through RBs belonging to BWUs in an idle state rather than through RBs belonging to BWUs in a non-idle state scheduled by the second downlink resource scheduling instruction.

In another embodiment, the receiving unit 901 is further configured to: receive deactivation signaling, in which the deactivation signaling is configured to deactivate other antenna panels except a designated antenna panel among the antenna panels; or receive a third downlink resource scheduling Instruction, in which the third downlink resource scheduling instruction is configured to characterize a TCI state of the designated antenna panel and not characterize TCI states of the other antenna panels except the designated antenna panel.

Regarding the apparatus 800 and the apparatus 900 in the above-mentioned embodiments, the specific manner in which each module executes operations has been described in detail in their respective method embodiments, which will not be elaborated here.

Figure 10:
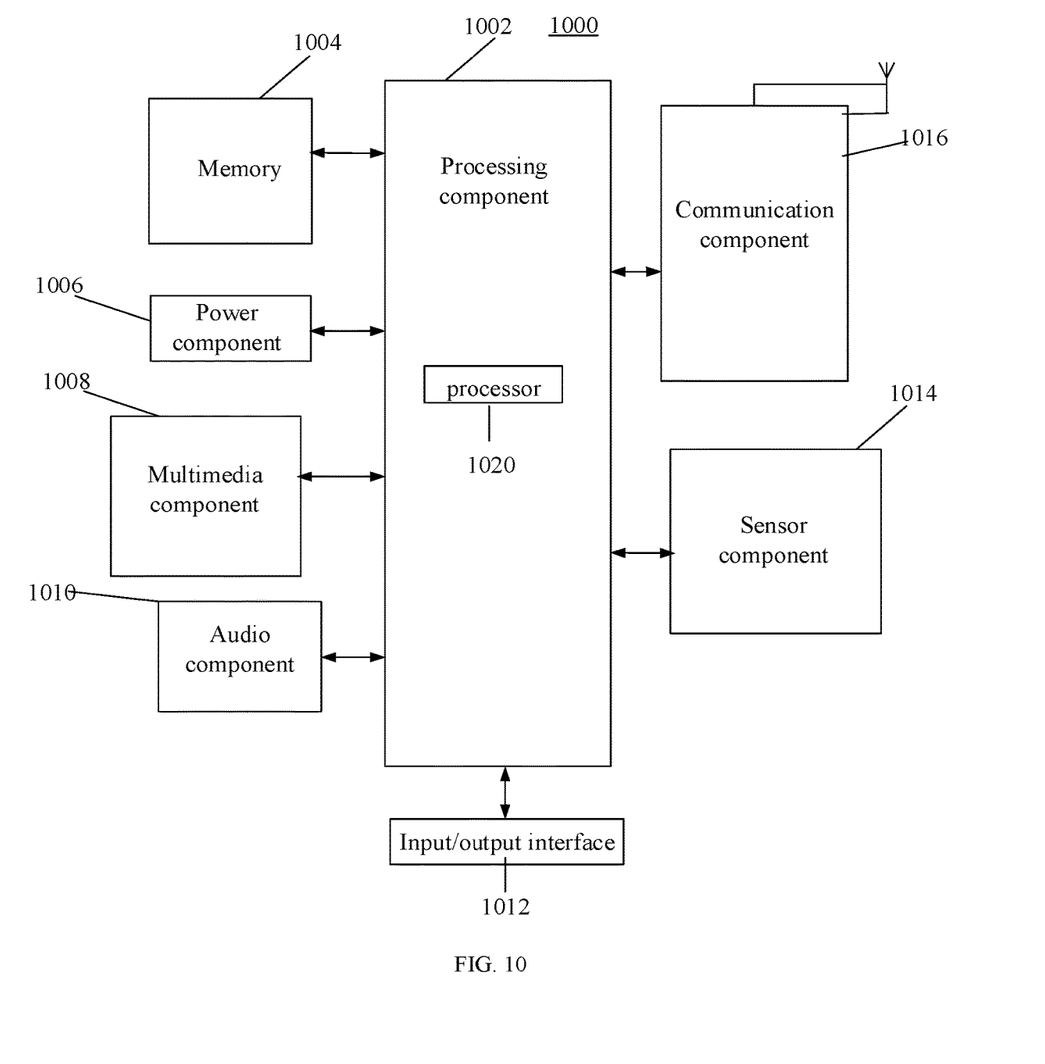
FIG. 10 is a block diagram illustrating a device for resource allocation according to an embodiment.

FIG. 10 is a block diagram illustrating a device 1000 for resource allocation according to an embodiment. For example, the device 1000 may be a mobile phone, a computer, a digital broadcasting terminal, a message transceiver device, a game console, a tablet device, a medical device, a fitness device and a personal digital assistant.

As illustrated in FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls overall operations of the device 1000, such as the operations associated with display, telephone calls, data communications, camera operations, and recording operations. The processing component 1002 may include one or more processors 1020 to execute instructions to perform all or part of the steps in the above described method. Moreover, the processing component 1002 may include one or more modules which facilitate the interaction between the processing component 1002 and other components. For instance, the processing component 1002 may include a multimedia module to facilitate interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front-facing camera and/or a rear-facing camera. When the device 1000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1010 is configured to output and/or input audio signals. For example, the audio component 1010 includes a microphone (MIC) configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as WiFi, 2G, or 3G, or a combination thereof. In an embodiment, the communication component 1016 receives a broadcast signal or broadcast associated information from an external broadcast management system via a broadcast channel. In an embodiment, the communication component 1016 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 1004, executable by the processor 1020 in the device 1000, for performing the above method. For example, the non-transitory computer-readable storage medium may be a ROM, a RAM, a CD-ROM, a magnetic tape, a floppy disc, an optical data storage device, and the like.

Figure 11:
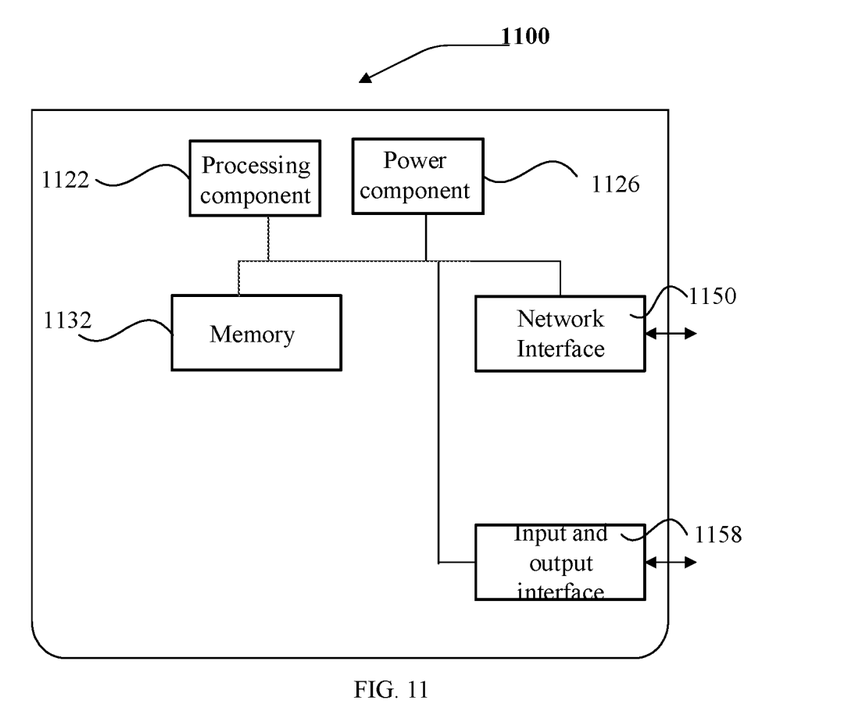
FIG. 11 is a block diagram illustrating a device for resource allocation according to an embodiment.

FIG. 11 is a block diagram illustrating a device 1100 for resources according to an embodiment. For example, the device 1100 may be provided as a network device. As illustrated in FIG. 11, the device 1100 includes a processing component 1122, which further includes one or more processors, and a memory resource represented by a memory 1132, for storing instructions that may be executed by the processing component 1122, such as application programs. The application program stored in the memory 1132 may include one or more modules each corresponding to a set of instructions. In addition, the processing component 1122 is configured to execute instructions to perform the above-mentioned methods.

The device 1100 may also include a power component 1126 configured to perform power management of the device 1100, a wired or wireless network interface 1150 configured to connect the device 1100 to a network, and an input/output (I/O) interface 1158. The device 1100 can operate based on an operating system stored in the memory 1132, such as Windows Server™, Mac OS X™, Unix™, Linux™, FreeBSD™ or the like.

In an embodiment, there is also provided a non-transitory computer-readable storage medium including instructions, such as a memory 1132 including instructions, which may be executed by the processing component 1122 of the device 1100 to complete the above method. For example, the non-transitory computer-readable storage medium may be a ROM, a RAM, a CD-ROM, a magnetic tape, a floppy disc, an optical data storage device, and the like.

The technical solution in the embodiment of the disclosure can include the following beneficial effects: when the network device has multiple TRPs/panels, the active BWP is determined based on the idle BWUs detected by multiple antenna panels, which realizes the reasonable allocation of resources for the terminal on multiple TRPs/panels, improves the spectrum efficiency and reduces power consumption of the terminal.

It may be understood that in the disclosure, "plurality" refers to two or more than two, and other quantifiers are similar. The term "and/or" describes an association relationship between the associated objects, indicating that there may be three types of relationships, for example, A and/or B, which can mean: A alone exists, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It may be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" may be used interchangeably. For example, without departing from the scope of the disclosure, the first information may also be referred to as second information, and similarly, the second information may also be referred to as first information.

It may be understood that, although the operations are described in a specific order in the drawings in the embodiments of the disclosure, it should not be understood that the operations are required to be performed in the shown specific order or in a serial order, or all the shown operations are required to be performed to get a desired result. In specific circumstances, multitasking and parallel processing may be advantageous.

Those skilled in the art will be aware of other embodiments of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary only, and the true scope and spirit of the disclosure are indicated in the following claims.

It may be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for resource allocation, performed by a network device having at least two antenna panels, comprising:
   determining a second bandwidth part, BWP based on idle bandwidth units, BWUs, detected by each of the at least two antenna panels in a first BWP; and
   transmitting an indication signaling, wherein the indication signaling is configured to indicate that the second BWP is taken as an active BWP, and/or to indicate a channel idle state of each BWU in the second BWP.

2. The method of claim 1, wherein the idle BWUs detected by each of the at least two antenna panels in the first BWP comprise identical BWUs; and
   wherein determining the second BWP comprises:
   selecting one or more BWUs as a first subset of BWUs from a first BWU set comprising the identical BWUs, and
   determining the second BWP based on the first subset of BWUs.

3. The method of claim 2, wherein determining the second BWP comprises:
   determining the second BWP based on spectrum position continuity of each BWU in the first subset of BWUs.

4. The method of claim 3, wherein the first subset of BWUs comprises BWUs with consecutive spectrum positions; and
   determining the second BWP comprises: determining the second BWP based on the BWUs with consecutive spectrum positions in the first subset of BWUs.

5. The method of claim 3, wherein the first subset of BWUs comprises BWUs with inconsecutive spectrum positions; and
determining the second BWP comprises:
preliminarily determining a second BWP based on BWUs with consecutive spectrum positions in the first subset of BWUs; and
obtaining a finally determined second BWP by adding BWUs whose spectrum positions are not consecutive with the preliminarily determined second BWP to the preliminarily determined second BWP, wherein a number of idle BWUs is greater than or equal to a number of busy BWUs in the added BWUs.

6. The method of claim 1, wherein the idle BWUs detected by each of the at least two antenna panels in the first BWP comprise different BWUs; and
determining the second BWP comprises: selecting one or more BWUs as a second subset of BWUs from a second set of BWUs comprising all the idle BWUs detected by each antenna panel in the first BWP, and determining the second BWP based on the second subset of BWUs.

7. The method of claim 1, wherein the idle BWUs detected by each of the at least two antenna panels in the first BWP comprise different BWUs; and
wherein determining the second BWP comprises:
selecting one or more BWUs as a third subset of BWUs from a third set of BWUs comprising all the idle BWUs detected by a designated antenna panel of the antenna panels in the first BWP, and
determining the second BWP based on the third subset of BWUs.

8. The method of claim 7, wherein the method further comprises:
deactivating other antenna panels except the designated antenna panel among the antenna panels, and transmitting a deactivation signaling; or
transmitting a third downlink resource scheduling instruction, wherein the third downlink resource scheduling instruction is configured to characterize a transmission configuration indication, TCI, state of the designated antenna panel, and not characterize TCI states of the other antenna panels except the designated antenna panel.

9. The method of claim 1, wherein the indication signaling comprises the channel idle state set for each BWU in the second BWP, and the channel idle state is configured to characterize whether a channel of the BWU is idle;
a number of channel idle states corresponding to each BWU is 1, or the number of channel idle states corresponding to each BWU is N, where N is a positive integer being less than or equal to a number of antenna panels of the network device.

10. The method of claim 1, wherein when the indication signaling is configured to indicate that the second BWP is taken as the active BWP, the method further comprises:
transmitting a first downlink resource scheduling instruction, wherein the first downlink resource scheduling instruction is configured to schedule resource blocks, RBs, for the terminal to receive downlink information.

11. The method of claim 1, wherein when the indication signaling is configured to indicate the channel idle state of each BWU in the second BWP, or when the indication signaling is configured to indicate that the second BWP is taken as the active BWP and the channel idle state of each BWU in the second BWP, the method further comprises:
transmitting a second downlink resource scheduling instruction, wherein the second downlink resource scheduling instruction is configured to schedule the terminal to receive downlink information through resource blocks, RBs, belonging to BWUs in an idle state rather than through RBs belonging to BWUs in a non-idle state.

12. A method for resource allocation, performed by a terminal, comprising:
receiving an indication signaling, wherein the indication signaling is configured to indicate that a second bandwidth part, BWP, is taken as an active BWP, and/or to indicate a channel idle state of each bandwidth unit, BWU, in the second BWP;
wherein the second BWP is determined based on idle BWUs detected by each of at least two antenna panels of a network device in a first BWP.

13. The method of claim 12, wherein the indication signaling comprises the channel idle state set for each BWU in the second BWP, and the channel idle state is configured to characterize whether a channel of the BWU is idle;
a number of channel idle states corresponding to each BWU is 1, or the number of channel idle states corresponding to each BWU is N, where N is a positive integer being less than or equal to a number of antenna panels of a network device.

14. The method of claim 12, wherein when the indication signaling is configured to indicate that the second BWP is taken as the active BWP, the method further comprises:
receiving a first downlink resource scheduling instruction; and
receiving downlink information through resource blocks, RBs, scheduled by the first downlink resource scheduling instruction.

15. The method of claim 12, wherein when the indication signaling is configured to indicate the channel idle state of each BWU in the second BWP, or when the indication signaling is configured to indicate that the second BWP is taken as the active BWP and the channel idle state of each BWU in the second BWP, the method further comprises:
receiving a second downlink resource scheduling instruction; and
receiving downlink information through resource blocks, RBs, belonging to BWUs in an idle state rather than through RBs belonging to BWUs in a non-idle state scheduled by the second downlink resource scheduling instruction.

16. The method of claim 12, wherein the method further comprises:
receiving a deactivation signaling, wherein the deactivation signaling is configured to deactivate other antenna panels except a designated antenna panel among the antenna panels; or
receiving a third downlink resource scheduling instruction, wherein the third downlink resource scheduling instruction is configured to characterize a transmission configuration indication, TCI, state of the designated antenna panel and not characterize TCI states of the other antenna panels except the designated antenna panel.

17. An apparatus for resource allocation, performed by a network device having at least two antenna panels, comprising:
a processor; and
a memory for storing instructions executable by the processor;

wherein the processor is configured to determine a second bandwidth part, BWP based on idle bandwidth units, BWUs, detected by each of the at least two antenna panels in a first BWP; and transmit an indication signaling, wherein the indication signaling is configured to indicate that the second BWP is taken as an active BWP, and/or to indicate a channel idle state of each BWU in the second BWP.

18. The apparatus of claim 17, wherein the idle BWUs detected by each of the at least two antenna panels in the first BWP comprise identical BWUs; and the processor is further configured to select one or more BWUs as a first subset of BWUs from a first BWU set comprising the identical BWUs, and determine the second BWP based on the first subset of BWUs.

19. The apparatus of claim 18, wherein the processor is further configured to determine the second BWP based on spectrum position continuity of each BWU in the first subset of BWUs.

20. The apparatus of claim 19, wherein the first subset of BWUs comprises BWUs with consecutive spectrum positions; and the processor is further configured to determine the second BWP based on the BWUs with consecutive spectrum positions in the first subset of BWUs.

* * * * *